United States Patent [19]

Gras

[11] 4,268,554

[45] May 19, 1981

[54] PROCESS FOR THE COATING OF GLASS SURFACES

[76] Inventor: Rainer Gras, An der Ziegelei 91, 4690 Herne 2, Fed. Rep. of Germany

[21] Appl. No.: 947,043

[22] Filed: Sep. 29, 1978

[30] Foreign Application Priority Data

Oct. 13, 1977 [DE] Fed. Rep. of Germany ....... 2746006

[51] Int. Cl.³ .................. B65D 23/00; B32B 7/02; B05D 3/00; B05D 3/02
[52] U.S. Cl. .................. 428/35; 215/12 R; 427/299; 427/379; 427/387; 427/389.7; 427/407.2; 428/215; 428/425.5; 428/425.6; 428/429; 428/430; 428/431; 428/447; 428/482
[58] Field of Search .............. 427/299, 385 A, 407 A, 427/379, 387, 389.7, 407.2; 428/429, 35, 431, 482, 215, 430, 447, 425.5, 425.6; 215/DIG. 6, 12 R

[56] References Cited

U.S. PATENT DOCUMENTS

| | | | |
|---|---|---|---|
| 3,585,103 | 6/1971 | Thomson | 427/387 X |
| 3,779,794 | 12/1973 | De Santis | 186/329 |
| 3,805,985 | 4/1974 | Hagiwara et al. | 428/35 X |
| 3,823,032 | 7/1974 | Ukai | 428/35 X |
| 3,889,031 | 6/1975 | Tatsumi et al. | 428/35 X |
| 4,015,044 | 3/1977 | Ranney et al. | 428/419 |
| 4,021,405 | 5/1977 | Tucker et al. | 260/45.95 X |
| 4,053,076 | 10/1977 | Vogel et al. | 215/12 R |
| 4,056,208 | 11/1977 | Prejean | 428/35 X |
| 4,093,759 | 6/1978 | Otsuki et al. | 428/35 |
| 4,099,638 | 7/1978 | Tatsumi et al. | 428/35 X |
| 4,118,540 | 10/1978 | Amort et al. | 428/447 |
| 4,130,677 | 12/1978 | Huntsberger | 427/379 |
| 4,143,181 | 3/1979 | Cahn et al. | 428/35 X |

FOREIGN PATENT DOCUMENTS

711374 6/1954 United Kingdom ................ 428/429

*Primary Examiner*—Michael R. Lusignan
*Attorney, Agent, or Firm*—Oblon, Fisher, Spivak, McClelland & Maier

[57] ABSTRACT

A process for the coating of glass surfaces to prevent the strewing of glass particles in case of bursting, with a transparent duroplastic protective layer of more than 50 microns, which comprises first treating the clean glass surface with an aqueous or alcoholic silane skim coat, drying the treated surface, and then coating the dry surface with a mass of aliphatic or cycloaliphatic diisocyanates or mixtures thereof, or their reaction products with water in a mole ratio of 2:≦1 and a mixture of hydroxyl-group-containing compounds comprising 40–80 wt. % trifunctional, hydroxy-group-containing polyesters made of ω-hydroxy-carboxylic acids or their lactones with at least four C-atoms, with an average molecular weight of 300 to 1400, 15–50 wt. % bifunctional, hydroxy-group-containing polyesters made of ω-hydroxy-carboxylic acids or thier lactones with a least 4 C-atoms with an average molecular weight of 400 to 2000 and 2.5–20 wt. % aliphatic or cycloaliphatic diols or mixtures thereof, with respect to the total quantity of the polyols, an optionally hardening the coated surfaces with additional heat.

16 Claims, No Drawings

PROCESS FOR THE COATING OF GLASS SURFACES

BACKGROUND OF THE INVENTION

1. Field of the Invention

The present invention deals with the coating of glass surfaces, especially glass bottles with a duroplastic polyisocyanate-polyol containing paste.

2. Description of the Prior Art

The coating of glass surfaces, especially glass bottles, with a very adhesive uniform and transparent layer of plastic, makes bottles extremely safe when they are used for carbonated beverages, such as beer, cola drinks, mineral water, fruit-juice drinks, etc., and in the case of returnable bottles, prolongs their usage. Because of blows and bumps, but also through the effect of heating in sunlight or by other heat sources, there have been in the past frequent explosions of unprotected bottles which have caused injuries of varying severity, especially eye injuries in humans.

Some of the previously known coatings for this purpose have the disadvantage that after repeated cleaning, the coating layer starts to cloud which, in the case of thermoplastic materials, may possibly be the result of an after crystallization effect of the plastic. Such bottles optically also make a negative impression and from the point of view of sales psychology, are also undesirable. The disadvantage of duroplastic, ether group-containing synthetic coatings is the rather low tearing strength and the oxidative susceptibility which results in an embrittlement of the protective layer, and thus, especially in the case of returnable bottles, after some time no longer guarantees protection against shattering.

SUMMARY OF THE INVENTION

It has been found that glass surfaces can be coated without these and other disadvantages if the process for the coating of glass surfaces, especially glass bottles, for preventing the strewing of glass particles in the case of bursting, with a transparent, duroplastic protective layer of more than 50 microns by applying a paste of polyisocyanates and hydroxyl-group-containing compounds as well as the customary processing additives, and for the hardening of the coating at higher temperatures, is carried out in such a way that the clean glass surface is first treated with an aqueous or alcoholic silane skim coat, it is dried and subsequently the treated glass surface is coated with a mass of aliphatic and/or cycloaliphatic diisocyanates or their reaction products with water in a mole ratio of $2:\leq 1$ and a mixture of hydroxyl-containing compounds comprising 40–80 weight-%, preferably 50–75 weight-%, trifunctional, hydroxyl-group containing polyester of $\omega$-hydroxy-carboxylic acids and their lactones with at least 4 C-atoms with an average molecular weight of 300 to 1 400, preferably 500 to 800.

15–50 weight-%, preferably 20–40 weight-%, bifunctional, hydroxyl-group-containing polyester of $\omega$-hydroxy-carboxylic acids or their lactones with at least 4 C-atoms with an average molecular weight of 400 to 2000, preferably 500 to 1 200, and 2.5–20 weight-%, preferably 5–15 weight-% aliphatic and/or cycloaliphatic diols, with respect to the total quantity of the polyols and the coated glass surface is hardened if necessary, with additional heat.

DETAILED DESCRIPTION OF THE PREFERRED EMBODIMENTS

The plastic protective layer that is applied in this way is highly elastic ans shows excellent adhesion, so that in the case of breakage of the glass or bursting of the bottle the glass splinters remain within the protective layer.

After the destruction of the glass bottle, the shpe of the bottle is completely maintained. The appearing kinetic energy is converted by stretching and heating of the plastic coating.

A special advantage is the resistance of the coating with regard to hot, alkali-containing washing liquids, in which the bottles are washed before being filled with beverages. This is especially true for returnable bottles, which, before each filling, are cleaned intensively.

The advantage of the coating according to the invention is the fact that even after repeated rinsing with hot, akaline washing liquid, there are no losses of the mechanical characteristic properties and no loss of adhesive properties. The glass bottles that have this type of plastic coating, may be used without reservations, as containers of carbonated beverages, since there is no longer a danger to humans in case of breakage or bursting.

When used as a returnable bottle, the duration of usage of a coated bottle is significantly longer than that of an uncoated bottle, which because of various processes through being rubbed against sharp edges and washing processes in hot solutions are severely stressed or even slightly damaged in regard to their surfaces.

In order to carry out this process, the cleaned glass surface, for example, of a glass bottle, is first treated with an aqueous or alcoholic silane skim coat. For this treatment, silanes are used with residues which have two different functions. On the one hand, there are lower alkoxy-residues, especially methoxy- and ethoxy-residues, which react with the OH-groups of the glass surface and, on the other hand, organic residues with such functional groups, which can react with the isocyanate groups, such as amino-, epoxide-, mercapto groups etc., for example, $\gamma$-aminopropyltrimethoxysilane, $\gamma$-aminopropyl-triethoxy-silane, glycidyloxypropyltriethoxy-silane, glycidyloxypropyl-trimethoxysilane, $\gamma$-mercaptopropyltrimethoxy-silane, $\gamma$-mercaptopropyl-triethoxy-silane etc. The treatment of the glass surface may, for example, take place by immersion or spraying with the wash agent. The treated glass surfaces may either be dried separately at 25°–100° C. or the drying takes place by heating the glass surfaces to 80° to 100° C., i.e., to a temperature, as it occurs in the manufacture of glass during the cooling process.

The application of the solvent-free PUR-two-component coating masses described in the following on the thus pretreated, preheated glass surfaces takes place according to known processes, such as pouring, spraying, immersion and similar processes.

After the application of the coating materials, the heat supply can be continued until the complete reaction takes place, if the available heat capacity should not be sufficient for the hardening itself.

The glass surface that is coated in this manner will then be subjected to the hardening at a temperature in the range of 150°–240° C., preferably 180°–210° C.

Suitable for the preparation of the coating are, for example, aliphatic and/or cycloaliphatic diisocyanates, as they are described, for example, in the article by W. Siefken in Justus Liebig's Annals of Chemistry 562, Pages 75-136; such as ethylene diisocyanate-1.2; tetramethylene diisocyanate-1.4; hexamethylene diisocyanate-1.6; 2.2.4- or 2.4.4-trimethylhexamethylene diisocyanate-1.6 (TMDI); dodecanediisocyanate-1.12;ω,ω-diisocyanatodipropylether; lysinediisocyanate; cyclobutane-1.3-diissocyanate cyclohexane-1.3 and 1.4-diisocyanate; 3-isocyanatomethyl-3.5.5-trimethylcyclohexylisocyanate, which is also named isophoron-diisocyanate and is abbreviated as IPDI; decahydro-8-methyl-(1.4-methanonaphthalene-2 (or 3) 5-ylen-dimethylene diisocyanate; hexahydro-4.7-methanoindan-1 (or 2) 5 (or 6) ylendimethylene-diisocyanate; hexahydro-4.7-methanoindan-1-(or 2) 5 (or 6)-ylendiisocyanate; hexahydrotoluylen-diisocyanate; perhydor-2.4' and/or -4.4'-diphenylmethane-diisocyanate; as well as arbitrary mixtures of the isomers. Only suitable isocyanates are described in the mentioned article in the Annals on pages 122 f. Naturally, mixtures of the isocyanates may also be used. Also suitable are the reaction products of these diisocyanates with water in the mole ratio of 2:≦1, especially those described in DT-OS No. 23 41 065.

The conversion of the polyol mixture with the diisocyanate takes place in such quantities that there are 0.8–1.2, preferably 0.96–1.1 isocyanate groups for 1 OH-group.

Especially suitable for the preparation of the solvent-free PUR-two-component coating are mixtures of trifunctional and bifunctional, hydroxyl-group-containing polyesters of ω-hydroxy-carboxylic acids or their lactones, in which case tri- or bifunctional polyesters are those with 3 or 2-OH groups. The molecular weight of the polyesters should be in the indicated range. The hydroxy-carboxylic acid or its lactone has st least 4 C-atoms in the chain. As the upper limit, those with 7 C-atoms can be used. Typical examples for suitable lactones are: γ-butyrolactones, α-valero-lactone, ε-caprolactone, methyl-ε-caprolactone and others.

The preparation of these lactone polyester polyols can take place by a known manner according to one of the processes described in U.S. Pat. Nos. 2,890,208; 2,977,885 or 2,933,478, in which triols or diols are converted as initiators with the lactones while heating with or without catalyst.

Suitable triols are, for example, glycerin, trimethylolpropane, trimethylolethane, triethanolamine, and similar compounds. Examples of diols which are suitable as initiators are ethylene glycol, neopentylglycol, propyleneglycol-1.2 and -1.3, butanediol-1.4 and -1.3; hexanediol-1.6; diethylene glycol; triethylene glycol or the ones mentioned below.

Instead of the lactones, the hydroxyl-group-containing polyesters that can be used according the the invention may also be prepared from the corresponding ω-hydroxy-carboxylic acids and triols according to the known processes.

The low-molecular, aliphatic and/or cycloaliphatic diols, which are used as the third polyol component in the process according to the invention, are those with a molecular weight of about 60 to about 250, for example, ethylene-glycol; 1.2-propyleneglycol; 1.3-propylene glycol; butanediol-1.3; butanediol-1.4; pentanediol-1.5; 2- or 3-methylpentanediol-1.5; hexadanediol-1.6; 1.4-cyclohexadanediol; 1.4-dimethylol-cyclohexane; 2.4.4-(2.2.4)-trimethylhexanediol-1.6; (TMH-diol); diethylene-glycol; triethylene glycol; tetraethylene glycol; pentaethylene glycol or mixtures of these diols. Of these low-molecular, aliphatic diols, hexanediol-1.6; 2.4.4-(2.2.4)-trimethylhexanediol-1.6 and butanediol-1.4 show the best results.

The average molecular weight of the polyol mixture used in the process according to the invention, consisting of tri- and bifunctional, hydroxyl-group-containing polyester polyols and low-molecular, aliphatic diols, should be between 300 and 800, preferably between 350 and 650. The functionality of the used, above-mentioned polyol mixtures should be between 2 and 3, preferably bwtween 2.4 and 2.9.

The special embodiment of the present process is the fact that the diisocyanate is first reacted with the low-molecular aliphatic diols to a prepolymer and then this polymer is used with the mixture of tri- and bifunctional hydroxyl-group-containing polyesters of ω-hydroxy-carboxylic acids or their lactones according to the invention. The special advantage of this process variant is the fact that in this manner, coating pastes with higher viscosity can be obtained. In addition, the danger of the coating mass sliding off the glass surface to be coated is notably decreased.

The reaction of the low-molecular, aliphatic diols, especially hexanediol-1.6; butanediol-1,4 and 2,4,4-(2,2,4)-trimethylhexanediol-1,6 with the aliphatic and-/or cycloaliphatic diisocyanates can take place according to arbitrary known methods, such as they are, for example described in "High Polymers" Vol. XVI Polyurethane; Chemistry and Technology I, Chemistry of Saunders and Frisch (1962), published by Interscience Publishers. In this manner, a prepolymer in the form of a colorless liquid is obtained, the NCO content of which is in the range of about 15% to about 30%.

The reaction is carried out at about 30° to 100° C. for a duration of 3 to 24 hours under practically dry conditions. If necessary, the reaction can take place in the presence of an inert gas, such as nitrogen.

In order to improve the flowing characteristics of the coatings, so-called flowing agents are added during the preparation. These agents may be chemical compounds or their mixtures of differing chemical types, for example, polymeric or monomeric compounds, for example, acetals, ether, interpolymers of n-butylacrylate and vinylisobutylether, silicon resins, fluorinated alkylesters etc. Such flowing agents may be added to the formulations in quantities of 0.05–0.5 weight-% referring to the overall composition.

The coating mass may also contain customary additives, such as dyes that are soluble in the polyols, stabilizers, foam removers etc. These may—with reference to the binding agents—polyol, isocyanate—fluctuate within a wide range. The quantity depends on the requirements in regard to the quality of the coatings.

Before the application of the coating masses, the components A and B are mixed intimately and evacuated until no more bubbles are rising. If necessary, the mixing and degasification process may be carried out according to the viscosity at an increased temperature.

The coating thicknesses of the hardened coatings may fluctuate between 50 and 250 μm according to the stress of the glass surfaces or glass bottles.

Another result of the invention are also the glasses, especially glass bottles, coated according to the above-described process.

Having generally described this invention, a further understanding can be obtained by reference to certain specific examples which are provided herein for purposes of illustration only and are not intended to be limiting unless otherwise specified.

The characteristic mechanical data of PUR-bottle coatings mentioned in the examples were determined according to the following methods:

| Tensile strength<br>Elongation<br>$\sigma_{100}$-tension | according to DIN 53 455 |

In addition, text foils were subjected to the following stability tests:

| Washing lye test: | 4 weight-% NaOH, 0.4 weight % Na-gluconate<br>1 cycle: 30 minutes/80° C. |
| --- | --- |
| Tropical conditions test: | 70° C./100% rel. air humidity |
| Sterilization: | 121° C./2 h |

In addition, adhesion and protection against fragmentation were tested. The protection against fragmentation was tested in a so-called falling test. For this purpose, 6.3 g $H_2SO_4$ (98 weight-%) and 9 g $NaHCO_3$ were filled into a coated 0.7 l beverage bottle and the bottle was closed. At a temperature of 25° C., the resulting $CO_2$-quantity produces an inside pressure of about 4.0 atm (atmospheric excess pressure). From a height of 1.2 m, the prepared test bottle was dropped on a concrete plate and the strewing of the fragments was observed.

The obtained coatings on the basis of solvent-free PUR-two-component coatings, in addition to high stability, also have high elongation values, high tearing strength and good low-temperature characteristics.

Description of the starting material used in the examples:

1. Components $A_{1-3}$: (hydroxyl-group-containing polyesters)

As multivalent, hydroxyl-group-containing polyesters, the polycaprolactones of Union Carbide Corporation were used, namely, the bifunctional types on the basis of diethylene glycol and $\epsilon$-caprolactone.

Polyester $A_1$:
With the hydroxyl number of 212 mg KOH/g an acid number of 0.3 mg KOH/g and an average molecular weight of 530

Polyester $A_2$:
With a hydroxyl number of 135 mg KOH/g an acid number of 0.3 mg KOH/g and an average molecular weight of 830 and the trifunctional types on the basis of 1,1,1-trimethylol-propane and $\epsilon$-caprolactone.

Polyester $A_3$:
With a hydroxyl number of 310 mg KOH/g an acid number of 0.3 mg KOH/g and an average molecular weight of 540

These polyesters can be prepared according to the processed described in U.S. Pat. Nos. 2,890,208; 2,977,885 and 2,933,478. The average molecular weights of these polyesters were calculated from the determined hydroxyl number.

Components $A_4$:
Aliphatic diol, as mentioned in the examples.

2. Components $B_{1-2}$: (diisocyanate)

In addition to the monomeric isophorondiisocyanate (hardener $B_1$), a urea adduct dissolved in isophorondiisocyanate was used that was prepared according to DT-OS 23 41 065 from IPDI and water, namely the IPDI Adduct $B_2$:

With an NCO-content of 31.5 weight-% an equivalent weight of 133.3 and a viscosity of 25° C. of 450 cP.

Components $B_{3-8}$:
(isocyanate-group-containing prepolymer)

Prepolymer $B_3$:
To 864.21 weight parts IPDI, were added 135.69 weight parts hexanediol-1,6 and 0.01 weight parts di-n-butyl-stannic dilaurate and subsequently stirred for 4 hours at 70° C. under dry nitrogen. The obtained reaction mixture has an NCO content of 22.9%.

Prepolymer $B_4$:
To 854.45 weight parts IPDI, were added 145.45 weight parts 2,4,4-(2,2,4)-trimethylene hexanediol-1,6 (1:1) and 0.01 weight parts di-n-butyl stannic dilaurate and subsequently stirred for 4 hours at 70° C. under dry nitrogen. The obtained reaction mixture has an NCO content of 24.5%.

Prepolymer $B_5$:
To 868.52 parts weight IPDI, were added 131.38 parts weight butanediol-1.4, and 0.01 parts weight di-n-butyl-stannic dilaurate and subsequently stirred for 4 hours at 70° C. under dry nitrogen. The obatained reaction mixture has an NCO-content of 20.3%.

Prepolymer $B_6$:
To 872.14 parts weight IPDI, were added 127.76 parts weight hexanediol-1.6, and 0.01 parts weight di-n-butyl-stannic dilaurate and subsequently stirred for 4 hours at 70° C. under dry nitrogen. The obtained reaction mixture has an NCO content of 23.72%.

Prepolymer $B_7$:
To 863.52 parts weight IPDI, were added 136.38 parts weight TMH-diol and 0.01 parts weight di-n-butyl stannic dilaurate and subsequently stirred for 4 hours at 70° C. under dry nitrogen. The obtained reaction mixture has an NCO content of 25.15%.

Prepolymer $B_8$:
To 878.24 parts weight IPDI, were added 121.66 parts weight butanediol-1.4 and 0.01 parts weight di-n-butyl-stannic dilaurate and subsequently stirred for 4 hours at 70° C. under dry nitrogen. The obtained reaction mixture has an NCO content of 21.64%.

Coating Pastes

In each of the following examples, first the component A, consisting of the tri- and bifunctional polyester and, if necessary aliphatic and/or cycloaliphatic diol, as well as the catalyst and flowing agent, was homogenized at 4° to 50° C. in the dissolver and subsequently evacuated until no more rising of bubbles. Then the component B—the hardener and the prepolymer—were added, mixed and again evacuated until free of bubbles.

The coating material was first applied to untreated glass plates that had been preheated to 80°–100° C. in order to produce foils for the determination of the characteristic mechanical data and for the stability tests, such as washing liquid and tropical conditions test as well as sterilization. For adhesion tests and falling test, glass plates that had been preheated to 80°–100° C. and pretreated with silane skim coat(Glycidyloxypropyl-trimethoxy-silane) were coated.

Table 1 shows examples of characteristic mechanical data of polyol combinations, consisting of trifunctional caprolactone-polyesterpolyol, linear caprolactone polyester polyol with an average molecular weight of 830 and hexanediol-1.6, TMH-diol or butanediol-1.4, in connection with IPDI and IPDI-add. $B_2$ or IPDI prepolymers $B_{3-5}$ according to the above description. The OH/NCO ration was 1:1. The hardening took place by a 14-minute heating to 200° C.

The reaction between the polyisocyanate on the one hand and hydroxyl-group-containing polyesters and diols on the other hand can be started or accelerated by menas of catalysts: Suitable catalysts are: Chelate compounds, such as stannic and zinc-octoate, di-n-butyl stannic dilaurate, di-n-butyl stannic diacetate and teriary amines, such as 1.4 diazobicyclotane-(2.2.2) and similar substances and their mixtures.

formulas with an elongation of about >150%. In the case of elongation values between 130 and 150%, the protection against fragmentation is significantly improved. The less the elongation of the foils (see also comparative example), the less the protection against fragmentation, i.e., the fragments of the bursting glass bottles can be found in an area of >2 m. The same observation was made when the elongation was >150%, but the tensile strength was about <28 N/mm$^2$.

Table 2 shows several more examples with the mechanical characteristic data of polyol combinations, consisting of trifunctional polyester polyols, linear polyester polyol with an average molecular weight of 530

TABLE 1

| Example | 1 | 2 | 3 | 4 | 5 | 6 | 7 | 8 | 9 | 10 | 11 |
|---|---|---|---|---|---|---|---|---|---|---|---|
| Components A | | | | | | | | | | | |
| Polyester $A_3$ | 366 | 365.2 | 289.83 | 377.4 | 376.3 | 300.17 | 472.97 | 353.36 | 300.6 | 298.8 | 278.47 |
| Polyester $A_2$ | 183 | 182.6 | 231.87 | 188.7 | 188.2 | 240.14 | 126.12 | 176.68 | 240.5 | 239.1 | 222.78 |
| Hexanediol-1.6 | 61 | — | 57.97 | — | — | — | — | — | — | — | — |
| TMH-diol | — | — | — | 62.9 | — | 60.03 | 31.53 | — | — | — | — |
| Butanediol-1.4 | — | — | — | — | — | — | — | 58.89 | 60.1 | — | 55.69 |
| Di-butyl stannic dilaurate | 0.5 | 0.5 | 0.5 | 0.5 | 0.5 | 0.5 | 0.5 | 0.5 | 0.5 | 0.5 | 0.5 |
| Commercial flowing agents on the basis of alkyl-esters of perfluorinated carboxylic acids | 1.0 | 1.0 | 1.0 | 1.0 | 1.0 | 1.0 | 1.0 | 1.0 | 1.0 | 1.0 | 1.0 |
| Components B | | | | | | | | | | | |
| IPDI $B_1$ | 388.5 | — | — | 369.5 | — | — | 367.88 | 409.57 | 397.3 | — | — |
| IPDI-adduct $B_2$ | — | — | 418.83 | — | — | 398.16 | — | — | — | — | 441.56 |
| Prepolymer $B_3$ | — | 450.7 | — | — | — | — | — | — | — | — | — |
| Prepolymer $B_4$ | — | — | — | — | 434 | — | — | — | — | — | — |
| Prepolymer $B_5$ | — | — | — | — | — | — | — | — | — | 460.6 | — |
| Mechanical Data | | | | | | | | | | | |
| Tensile strength N/mm$^2$ | 47.0 | 46.5 | 40.4 | 45.5 | 46.0 | 41 | 42.2 | 39.5 | 42.5 | 41.0 | 40 |
| Elongation % | 230 | 225 | 165 | 240 | 230 | 180 | 175 | 155 | 210 | 213 | 170 |

The results of the stability tests, such as washing liquid and tropical conditions test, as well as sterilization are shown in Table 3. The adhesion of the coating pastes on the pretreated glass bottles and plates (even after 5 cycles of the wasing liquid test) was excellent. Protection against fragmentation was guaranteed in the and hexanediol-1.6. TMH-diol and butanediol-1.4 in connection with IPDI or the prepolymers $B_{6-8}$. The OH/NCO ration was also 1:1.

TABLE 2

| Example | 12 | 13 | 14 | 15 | 16 | 17 |
|---|---|---|---|---|---|---|
| Components A | | | | | | |
| Polyester $A_2$ | 365,45 | 354,30 | 366,28 | 364,08 | 289,52 | 288,20 |
| Polyester $A_1$ | 182,73 | 177,15 | 183,14 | 182,04 | 231,62 | 230,56 |
| Hexanediol - 1.6 | 60,91 | — | — | — | — | — |
| TMH-diol | — | — | 61,04 | — | — | — |
| Butanediol - 1.4 | — | — | — | — | 57,90 | — |
| Sn-octoate | 2,0 | 2,0 | 2,0 | 2,0 | 2,0 | 2,0 |
| Co-mercial flowing agent on the basis of alkyl-esters of perfluorinated carboxylic acids | 1,0 | 1,0 | 1,0 | 1,0 | 1,0 | 1,0 |
| Components B | | | | | | |
| IPDI - $B_1$ | 387,91 | — | 386,54 | — | 417,96 | — |
| Prepolymer $B_6$ | — | 465,55 | — | — | — | — |
| Prepolymer $B_7$ | — | — | — | 450,88 | — | — |
| Prepolymer $B_8$ | — | — | — | — | — | 478,24 |
| Mechanical Data | | | | | | |
| Tensile strength N/mm$^2$ | 49,5 | 48 | 46,4 | 46,7 | 44,7 | 43,8 |
| Elongation | 200 | 190 | 205 | 210 | 185 | 175 |

The figures for the components A and B in Tables 1 and 2 mean either gram product or weight parts product.

| Example | | | | 2 | 6 | 9 | 12 | 14 | 15 | 17 | 19 |
|---|---|---|---|---|---|---|---|---|---|---|---|
| Washing Liquid Test | | | | | | | | | | | |
| Before the Test | Tensile strength $\sigma_B$ | | N/mm$^2$ | 46,5 | 44 | 41,5 | 40,5 | 39,4 | 48,7 | 46,1 | 44,1 |
| | Elongation $\sigma_B$ | | $\sigma_B$ % | 220 | 230 | 180 | 215 | 175 | 205 | 200 | 175 |
| | $\sigma_{100}$ Tension | $\sigma_{100}$ | N/mm$^2$ | 14,0 | 13,5 | 12,5 | 13 | 11,5 | 14,4 | 13,9 | 15,3 |
| After 5th Cycle | | | | 26,0 | 23,5 | 22,0 | 23,0 | 20,3 | 27,3 | 25,8 | 23,2 |

-continued

| Example | | | 2 | 6 | 9 | 12 | 14 | 15 | 17 | 19 |
|---|---|---|---|---|---|---|---|---|---|---|
| | $\sigma_B$ | N/mm$^2$ | | | | | | | | |
| | After 24 h at RT | 45,0 | 42,5 | 41,0 | 43,0 | 39,0 | 46,1 | 44,5 | 43,7 | |
| After | After 5th Cycle | | 225 | 230 | 195 | 230 | 180 | 200 | 210 | 180 |
| the | $\epsilon_B$ | % | | | | | | | | |
| Test | After 24 h at RT | | 195 | 195 | 200 | 205 | 160 | 185 | 190 | 165 |
| | After 5th Cycle | | 5,2 | 5,4 | 5,3 | 4,4 | 4,0 | 5,9 | 5,3 | 5,7 |
| | $\sigma$100 | N/mm$^2$ | | | | | | | | |
| | After 24 h at RT | | 17,0 | 16,8 | 15,2 | 14,1 | 12,1 | 16,9 | 16,4 | 15,2 |
| Tropical Conditions Test | | | | | | | | | | |
| Before | Tensile strength B | N/mm$^2$ | 45,0 | 43,5 | 42,0 | 41,4 | 40,1 | 48,4 | 44,9 | 42,9 |
| the | Elongation B | % | 210 | 215 | 190 | 205 | 170 | 210 | 195 | 180 |
| Test | $\sigma_{100}$ Tension 100 | N/mm$^2$ | 15,0 | 14,0 | 13,5 | 14,3 | 11,7 | 15,1 | 14,1 | 14,9 |
| | $\sigma$B After 1 d + 24 h at RT | N/mm$^2$ | 45,0 | 44,0 | 40,0 | 40,5 | 39,1 | 47,8 | 45,1 | 42,7 |
| | $\epsilon$B After 1 d + 24 h at RT | % | 220 | 225 | 190 | 200 | 160 | 200 | 185 | 190 |
| | $\sigma$100 After 1 d + 24 h at RT | N/mm$^2$ | 10,5 | 10,0 | 9,2 | 11,6 | 10,1 | 10,8 | 12,4 | 12,1 |
| After | $\sigma$B After 7th d + 24 h at RT | N/mm$^2$ | 41,5 | 39,5 | 38,1 | 39,0 | 38,3 | 42,1 | 43,0 | 40,1 |
| the | $\epsilon$B After 7th d + 24 h at RT | % | 205 | 210 | 175 | 185 | 150 | 190 | 175 | 180 |
| Test | $\sigma$100 After 7th d + 24 at RT | N/mm$^2$ | 11,0 | 10,5 | 9,8 | 10,0 | 8,7 | 11,5 | 12,6 | 12,7 |
| | $\sigma$B After 14th d + 24 h at RT | N/mm$^2$ | 38,5 | 38,0 | 37,5 | 38,0 | 35,7 | 38,7 | 38,9 | 38,5 |
| | $\epsilon$B After 14th d + 24 h at RT | % | 190 | 195 | 165 | 170 | 150 | 185 | 170 | 160 |
| | $\sigma$100 After 14th d d = 24 at RT | N/mm$^2$ | 16,0 | 15,0 | 14,4 | 15,3 | 10,8 | 16,5 | 15,1 | 14,8 |
| Weight Increase | | % | 2,1 | 2,0 | 2,1 | 2,2 | 2,0 | 2,1 | 2,2 | 2,1 |

COMPARATIVE EXAMPLE 1

Components A 384.87 parts weight polyether polyol (OH-Z.: 108 mg KOH/g) linear 102.68 parts weight polyether polyol (OH-Z.: 258 mg KOH/g) linear 102.0 parts weight trimethylopropane 2.0 parts weight Sn-octoate 1.0 parts weight commercial flowing agent on the basis of alkylesters of perfluorinated carboxylic acids

Components B 407.45 parts weight IPDI

Mechanical Characteristics

Tensile strength 18.0 N/mm$^2$
Elongation 10%
No protection against fragments was guarenteed.

COMPARATIVE EXAMPLE 2

Components A 225.12 parts weight polytetramethylene ether glycol (OH-Z.: 173.5 mg KOH/g)

262.43 parts weight polytetramethylene ether glycol (OH-Z.: 110.5 mg KOH/g)

102.0 parts weight trimethylolpropane 2.0 parts weight Sn-octoate 1.0 parts weights flowing agent analoguous to comparative example 1

Components B 407.45 parts weight IPDI

Mechanical Characteristics

Tensile strength 35.0 N/mm$^2$
Elongation 160%

In the falling test, slight strewing of glass fragments was observed. In addition, after the hardening process, the foils showed a clear yellow coloring and as early as after 400 h accelerated weathering in the Xeno-test, there was embrittlement and destruction of the foil after 650 h.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A process for the coating of glass surfaces, to prevent the strewing of glass particles in case of bursting, with a transparent, duroplastic protective layer of more than 50 microns which comprises
   first treating the clean glass surface with an aqueous or alcoholic silane skim coat,
   drying said treated surface, and then
   coating said dry surface with a mass of aliphatic or cycloaliphatic diisocyanates or mixtures thereof, or their reaction products with water in a mole ratio of 2:≦1 and a mixture of hydroxy-group-containing compounds comprising
   40–80 wt.% trifunctional, hydroxy group-containing polyesters made of $\omega$-hydroxy-carboxylic acids or their lactones with at least 4 C-atoms with an average molecular weight of 300 to 1400,
   15–50 wt.% bifunctional, hydroxy group-containing polyesters made of $\omega$-hydroxy carboxylic acids or their lactones with at least 4 C-atoms with an average molecular weight of 400 to 2000 and
   2.5–20 wt.% aliphatic or cycloaliphatic diols, or mixtures thereof with respect to the total quantity of the polyols, and
   optionally hardening said coated surface with additional heat.

2. A process according to claim 1, wherein the trifunctional, hydroxyl-group-containing polyester has an average molecular weight of 500 to 800.

3. A process according to claims 1 or 2, wherein the bifunctional, hydroxyl-group-containing polyester has an average molecular weight of 500 to 1 200.

4. A process according to claim 1, wherein polyester diols and diols as well as polyisocyanates are used in such quantities that there are 0.8 1.2 isocyanate groups for one OH-group.

5. A process according to claim 4, wherein there are 0.95–1.1 isocyanate groups for one OH-group.

6. A process according to the claim 1, wherein a prepolymer is first made from the polyisocyanates and aliphatic diols and is then used.

7. A process according to claim 6, wherein the coated glass surfaces are subjected to hardening at a temperature in the range of 150°–240° C.

8. A process according to claim 7, wherein the hardening is carried out at temperatures in the range of 180°–210° C.

9. The process of claim 1 wherein said glass surfaces are glass bottles.

10. Coated glass bottles with a transparent, duroplastic protective layer, prepared according to claim 9.

11. The process of claim 1 wherein said trifunctional hydroxy-group-containing polyesters are present in an amount of 50–75% by weight.

12. The process of claim 1 wherein said bifunctional hydroxy-group-containing polyester are present in an amount of 20–40% by weight.

13. The process of claim 1 wherein said aliphatic or cycloaliphatic diols are present in an amount of 5–15 wt.%.

14. The process of claim 1 wherein said coated surface is hardened by further heating.

15. The process of claim 1 wherein said silane has at least two functionally correlated groups one of which will react with a glass surface and the other will react with isocyanate groups.

16. The process of claim 1 wherein said coating mass contains 0.05–0.5% by weight of a flowing agent.

* * * * *